United States Patent [19]
Ross, Jr. et al.

[11] 3,714,547
[45] Jan. 30, 1973

[54] VOLTAGE REGULATION CIRCUIT

[75] Inventors: Theron A. Ross, Jr., Rochester; Jon W. Youngman, Macedon, both of N.Y.

[73] Assignee: Eastman Kodak Company, Rochester, N.Y.

[22] Filed: July 16, 1971

[21] Appl. No.: 163,159

[52] U.S. Cl..................323/24, 307/252 T, 307/297, 323/34
[51] Int. Cl...............................................G05f 1/32
[58] Field of Search......323/9, 22 SC, 24, 21, 38, 34; 321/18; 307/297, 252 N, 252 Q, 252 T, 252 B

[56] References Cited
UNITED STATES PATENTS

| | | | |
|---|---|---|---|
| 3,646,439 | 2/1972 | Broski | 323/22 SC X |
| 3,648,437 | 3/1972 | Bridges | 323/22 SC X |
| 3,501,771 | 3/1970 | Miller et al. | 323/22 SC |
| 3,573,604 | 4/1971 | Lundgreen | 323/22 SC X |
| 3,440,517 | 4/1969 | Page et al. | 321/18 |
| 3,465,237 | 9/1969 | Brookmire | 323/21 |

*Primary Examiner*—Gerald Goldberg
*Attorney*—W. H. J. Kline et al.

[57] ABSTRACT

A voltage regulation circuit for maintaining the RMS voltage supplied to a load substantially constant compared to the RMS line voltage. A triac connected in series with an AC load is gated to conduction for more than 180° but less than 360° of each cycle by means of a trigger circuit including an operational amplifier which sums the voltage developed across a capacitor during the first half cycle of the AC input voltage with a reference voltage to produce a varying output voltage which controls the length of time that the triac conducts during the second half cycle and during the next succeeding first half cycle of the input signal.

5 Claims, 1 Drawing Figure

PATENTED JAN 30 1973
3,714,547
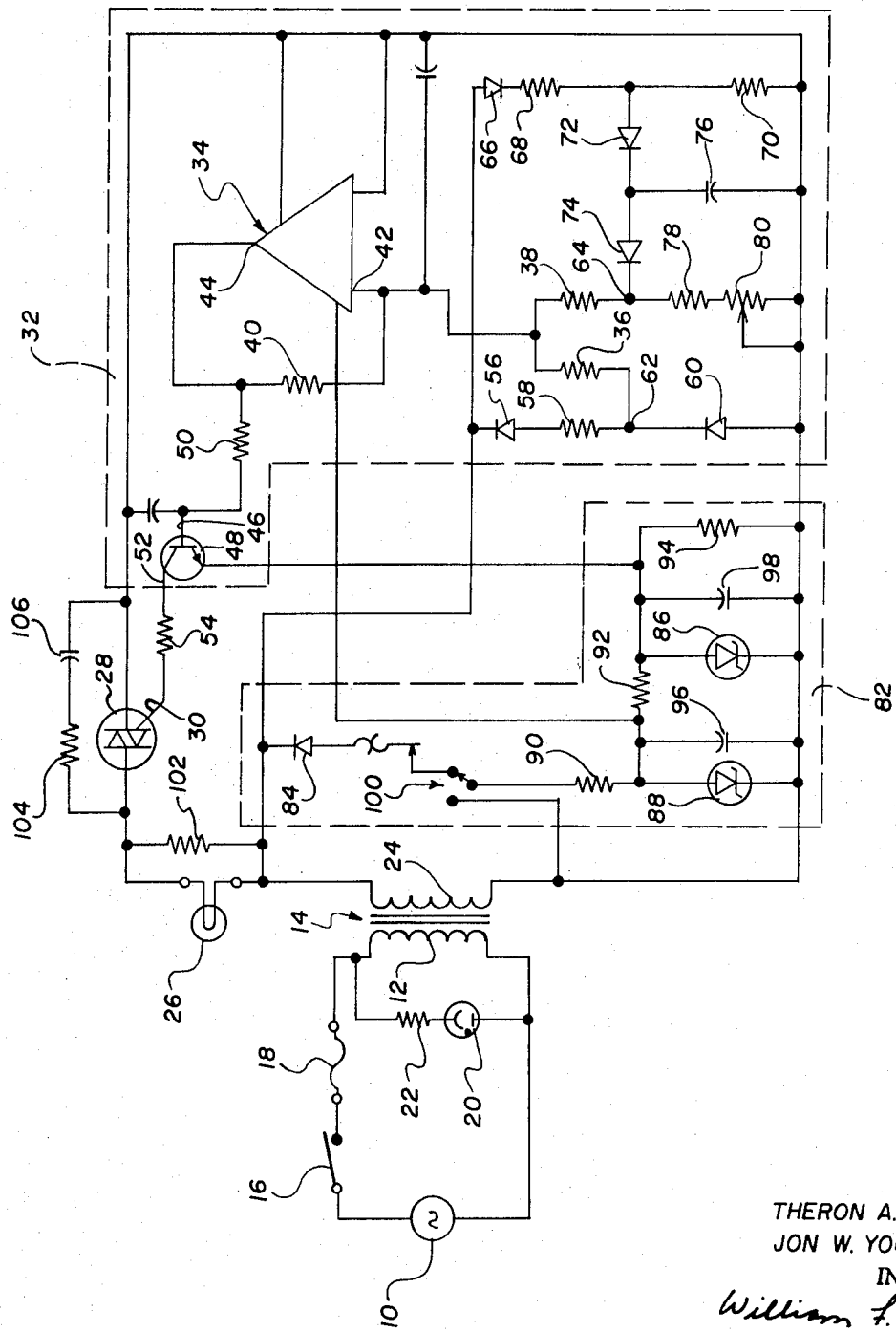
THERON A. ROSS, JR.
JON W. YOUNGMAN
INVENTORS
William F. Noval
BY
W. H. J. Kline
ATTORNEYS

VOLTAGE REGULATION CIRCUIT

BACKGROUND OF THE INVENTION

1. Field of the Invention

This invention relates to voltage regulation circuits and more particularly to an improved circuit for maintaining the RMS voltage supplied to an AC load substantially constant despite variations in the RMS value of the input signal from an AC source.

2. Description of the Prior Art

In many applications it is desirable that the RMS voltage supplied to an AC load be maintained substantially constant despite relatively wide variations in the line voltage. For example, in microfilm readers it is desirable that the projection lamp be maintained at a constant voltage to avoid variations in screen illumination and attendant eye strain. It is also desirable that any fluctuation in line voltage be compensated for during each cycle in a simple and efficient manner. Many prior art voltage regulation circuits have either been extremely complex or utilized expensive electronic components.

SUMMARY OF THE INVENTION

According to the present invention a voltage regulation circuit is provided for maintaining a substantially constant RMS voltage to an AC load which includes a triac connected in series with the load. The triac is caused to conduct during the entire first half cycle of the AC input signal and during a portion only of the second half cycle of the input signal as a function of the magnitude of the AC line voltage during the first half cycle. According to an aspect of the invention, a trigger circuit for gating the triac includes an operational amplifier which compares the voltage developed across a capacitor during one half cycle of the AC input voltage with a reference voltage to control the triac conduction during the second half cycle of the AC input voltage and during the next succeeding one half cycle of the AC input voltage.

It is thus an object of the present invention to provide an AC voltage regulation circuit which maintains a substantially constant RMS voltage to an AC load.

The invention and its objects and advantages will become more apparent in the detailed description of the preferred embodiment presented below.

BRIEF DESCRIPTION OF THE DRAWING

The above objects and advantages of the present invention will become apparent to those skilled in the art from the following detailed description read in conjunction with the attached drawing wherein:

The sole FIGURE is an electrical schematic diagram of an embodiment of voltage regulation circuit according to the present invention.

DESCRIPTION OF THE PREFERRED EMBODIMENT

Referring now to the sole FIGURE there is shown a preferred embodiment of voltage regulation circuit according to the present invention. As shown, an alternating current signal source 10 supplies an unregulated AC voltage to the primary winding 12 of transformer 14. Also provided in the primary circuit are on-off switch 16, fuse 18 and indicator lamp 20 having current limiting resistor 22 in series therewith.

The secondary winding 24 of transformer 14 supplies a stepped down voltage to an AC load such as lamp 26 connected in series with triac 28. Triac 28 is basically a bi-directional current carrying device with conduction in both directions being controlled by gate 30. By applying an appropriate signal to gate 30 each proportion of the cycle in which current flows can be controlled to produce a substantially constant RMS voltage through lamp 26 despite wide variations in the voltage of source 10.

A trigger circuit 32 for supplying a gating signal to triac gate 30 includes an operational amplifier 34 having input resistors 36 and 38 and resistor 40 connected between input terminal 42 and output terminal 44 of amplifier 34. The output of amplifier 34 is connected to the base 46 of transistor 48 by means of resistor 50, with the collector 52 of transistor 48 being connected to gate 30 by means of resistor 54.

Connected in series across the output of secondary winding 24 are diode 56, resistor 58 and diode 60 which develop a reference voltage at terminal 62 at the input to amplifier input resistor 36. As will be described in greater detail below, a sample voltage will be developed at terminal 64 at the input to amplifier input resistor 38 by means of a circuit comprising diode 66, resistor 68 and resistor 70 connected in series across secondary 24, diodes 72 and 74, capacitor 76, resistor 78 and variable resistor 80. Resistor 80 functions as a control to adjust the illumination of lamp 26.

A power supply circuit 82 for supplying power to transistor 48 and amplifier 34 comprises diodes 84, 86 and 88, resistors 90, 92, and 94, capacitators 96 and 98 and switch 100.

A current limiting resistor 102 is provided across lamp 26 and resistor 104 and capacitor 106 are provided across triac 28.

In operation, after the circuit has stabilized, during a positive half cycle AC voltage from source 10 supplied by transformer 14 to the series circuit formed by lamp 26 and triac 28 will cause current to flow in lamp 26 during the entire half cycle since the output of amplifier 34 is at a level such that transistor 48 conducts for the entire half cycle thus gating triac 28 to conduction at the beginning of the half cycle. During the positive cycle current will also flow through diode 66, resistor 68 and diode 72 to charge capacitor 76 to a voltage determined by the values of resistors 68 and 70 which form a voltage divider.

During the negative half cycle, triac 28 will block the flow of current through lamp 26 until gate 30 has been triggered. After gate 30 has been triggered, it has no further control over conduction of triac 28 during the remainder of the half cycle. The time at which gate 30 is triggered will be dependent on the voltage to which capacitor 76 has been charged during the positive half cycle which in turn is dependent upon the input value of the line voltage of source 10.

During the negative half cycle capacitor 76 discharges through resistors 78 and 80 to develop a sample voltage at terminal 64. This sample voltage is compared with a reference voltage at terminal 62 by multiplying each voltage by a constant and adding them algebraically by means of operational amplifier 34. The output voltage of amplifier 34 will be a function of the following voltage summation:

$$\frac{\text{Val. of R 40}}{\text{Val. of R 36}} \times \text{Ref. Voltage} + \frac{\text{Val. of R 40}}{\text{Val. of R 38}} \times \text{sample voltage}$$

During the positive half cycle of the AC input voltage developed across the output of transformer 14, the output of amplifier 34 will be more positive than a certain predetermined value V dependent upon the particular amplifier used, transistor 48 will be biassed to conduction the triac 28 will have been triggered to conduction at the beginning of the positive half cycle. During the negative half cycle, the output of amplifier 34 will be initially more negative than V, transistor 48 will be non-conducting and triac 28 will also be non-conducting. As the negative half cycle continues, the sample voltage decreases causing the output of amplifier 34 to become less negative. When the output of amplifier 34 becomes approximately equal to V, the base-emitter junction of transistor 48 is forward biassed. Transistor 48 starts to conduct, supplying gate current to triac gate 30 and causing triac 28 to conduct for the remainder of the negative half cycle. Thus, the lamp current flows for the positive half cycle and some portion of the negative half cycle.

If the line voltage of source 10 increases, thus increasing the voltage supplied by transformer 14 to lamp 26, the sample voltage will also increase and capacitor 76 will be charged to a higher potential. Capacitor 76 will take longer to discharge through resistors 78 and 80 during the negative half cycle to a value which causes the output of amplifier 34 to equal V. Thus, the triac is triggered into conduction later in the negative half cycle and current will flow for a lesser period of time through lamp 26. This effectively lowers the RMS voltage across the lamp.

If, on the other hand, the line voltage of source 10 decreases, thus decreasing the voltage supplied by transformer 14 to lamp 26, capacitor 76 will be charged to a lower potential. During the negative half cycle, capacitor 76 will take a shorter time to discharge and triac 26 will be gated to conduction earlier in the cycle, allowing current to flow for a greater period of time and thus effectively increasing the RMS voltage across lamp 26.

Thus, it is seen that fluctuation in the line voltage of source 10 will be corrected for in the same cycle that the fluctuation takes place. Consequently, a substantially constant RMS voltage will be supplied to lamp 26 despite relatively wide fluctuations in the RMS value of the line voltage.

Switch 100 is a switch which may, for example, be activiated by insertion of microfilm into a microfilm reader. When switch 100 is closed, i.e. moved to the position shown in FIG. 1, power will be supplied to transistor 48 and amplifier 34. Because of the action of the elements of power circuit 82, the current through lamp 26 will increase to a much lower multiple of its rated current than would normally be true, thus minimizing line current surges when lamp 26 is turned on. As capacitor 96 charges the lamp illumination increases slowly and stabilizes after approximately five cycles.

Thus, there is seen that there is provided a new and improved voltage regulation circuit which supplies a substantially constant RMS voltage to an AC load despite relatively wide variations in the AC line voltage. In addition variations in line voltage are compensated for within the same cycle that they occur thus increasing the efficiency of the circuit.

The invention has been described in detail with particular reference to a preferred embodiment thereof, but it will be understood that variations and modifications can be effected within the spirit and scope of the invention.

We claim:

1. A regulation circuit comprising:

input circuit means connectable to an AC signal source;

output circuit means connectable to an AC load;

bidirectional current carrying means connected between said input circuit means and said output circuit means, said current carrying means being switchable in a first mode between a nonconductive state and a conductive state to carry current in a first conduction direction during a first half-cycle of an AC input signal and being switchable in a second mode between a non-conductive state and a conductive state to carry current in a second conduction direction during a second half-cycle of said input signal;

control means connected to said current carrying means for selectively causing said current carrying means to switch between a nonconductive state and a conductive state in either of said first or second modes;

operational amplifier means having an output terminal connected to said control means and having an input terminal, means connected to said input terminal of said operational amplifier means for providing a reference voltage;

means connected to said input circuit means and to said input terminal of said operational amplifier means for developing a sample voltage proportional to the input voltage during the first half-cycle of an AC input signal;

said operational amplifier means summing said reference voltage and said sample voltage during the second half-cycle of said AC input signal to produce at said amplifier means output terminal a varying output signal which in said second mode causes said control circuit means to switch said current carrying means between the nonconductive state and the conductive state at a conduction angle which is a function of the sum of said reference voltage and said sample voltage, such that said current carrying means carries current in said second conduction direction during a portion only of said second half-cycle of said AC input signal and which in said first mode causes said control circuit means to switch said current carrying means between said nonconductive state and said conductive state at the beginning of the next succeeding first half-cycle of said AC input signal, such that said current carrying means carries current in said first conduction direction during the entire next succeeding first half-cycle of said AC input signal.

2. The regulation circuit of claim 1 wherein said bidirectional current carrying means includes a triac having a gate.

3. The regulation circuit of claim 2 wherein said control means includes a transistor connected to said gate.

4. The regulation circuit of claim 3 wherein said means for providing a reference voltage includes a diode.

5. The regulation circuit of claim 4 wherein said means for developing a sample voltage includes a capacitor.

* * * * *